Jan. 1, 1924. 1,479,519
J. C. STEINER
SHORT CIRCUITING DEVICE FOR ELECTRIC MOTORS
Filed June 3, 1921
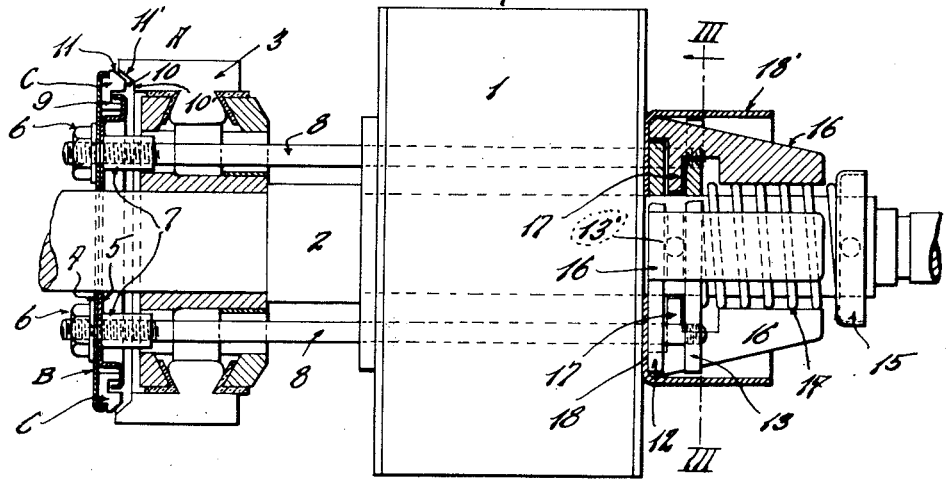
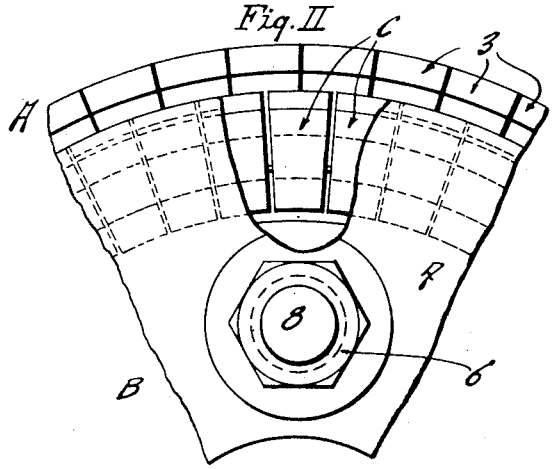
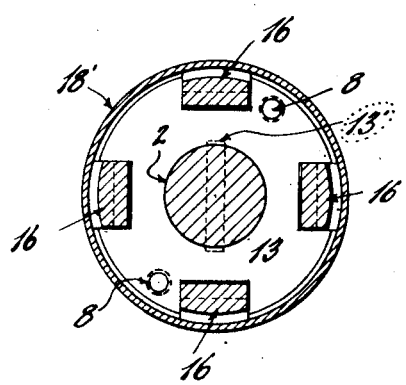
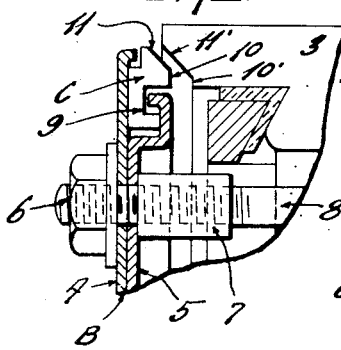
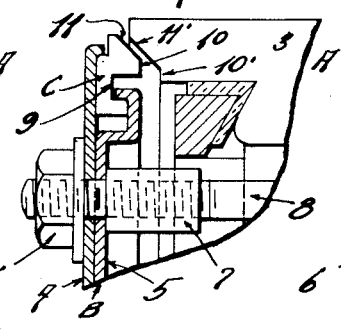
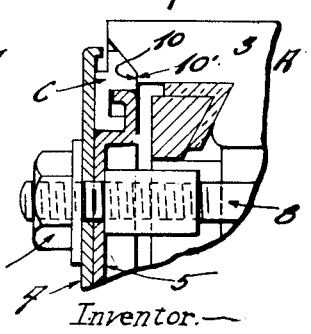
Inventor.—
J. C. Steiner
by Cook & McCauley Attys.

Patented Jan. 1, 1924.

1,479,519

UNITED STATES PATENT OFFICE.

JOSEPH C. STEINER, OF ST. LOUIS, MISSOURI.

SHORT-CIRCUITING DEVICE FOR ELECTRIC MOTORS.

Application filed June 3, 1921. Serial No. 474,709.

*To all whom it may concern:*

Be it known that I, JOSEPH C. STEINER, a citizen of the United States of America, a resident of the city of St. Louis, in the State of Missouri, have invented certain new and useful Improvements in Short-Circuiting Devices for Electric Motors, of which the following is a full, clear, and exact description, reference being had to the accompanying drawings, forming a part of this specification.

This invention relates to improvements in short-circuiting devices for electric motors, and the like, and more particularly to a short-circuiting device adapted to be associated with a commutator of a motor so as to electrically connect the commutator segments when the motor is operated at a predetermined speed. In a repulsion-induction type motor, the adjacent segments of the commutator are insulated from each other in the usual manner, and a speed-responsive short-circuiting device is employed to directly connect the commutator segments when the motor is running at the normal high speed. In starting the motor, the short-circuiting device is ineffective, but in response to the gradually increasing speed of the motor, the short-circuiting device is automatically operated to form a short circuit around the commutator.

My object is to produce a simple and highly efficient device of this kind. More specifically stated, an object is to avoid defective connections which have heretofore resulted from burning the contacting faces at the short-circuiting device. To form the short circuit, one contact member moves into engagement with another and this has resulted in arcs, or sparks, which form small, irregular pits and scale on the contacting faces, and as a consequence the old short-circuiting devices of this kind have not withstood long continued service.

The preferred form of the present invention comprises a rotary holder in which a series of short-circuiting contact members are yieldingly mounted. The rotary holder turns with the commutator, and in response to centrifugal force, the contact members are thrown away from the axis of the holder and toward the commutator. These loosely mounted contact members are movable independently of each other, so each contact member will effectively engage the commutator.

Each short-circuiting contact member is provided with an initial contact face adapted to engage and slide on the commutator, thereby rubbing the commutator and tending to remove deposits and irregularities resulting from the arcs which occur at this point. In addition to this, each short-circuiting contact member is provided with a final contact face adapted to engage the commutator after the initial contact face is frictionally engaged with the commutator. To obtain the desired contact, the initial contact face is engaged with and rubbed on the commutator while the final contact face is moving toward its point of contact, so there is no spark, or arc, produced between the final contact face and its point of contact on the commutator. As a result, a substantially perfect electrical connection is produced and maintained at the final contact face of each short-circuiting member.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a side elevation, partly in section, illustrating a short-circuiting device associated with the commutator of an electric motor.

Fig. II is an enlarged fragmentary detail showing a portion of the commutator and a portion of the short-circuiting device adapted to engage the commutator segments, a part of the holder for the short-circuiting contacts being broken away at the middle of the view.

Fig. III is a section taken approximately on the line III—III, in Fig. I.

Fig. IV is an enlarged detail view showing a short-circuiting contact separated from the commutator.

Fig. V is a view similar to Fig. I, showing the contact member in the position it occupies when it is thrown outwardly by centrifugal force, so as to locate its initial contact face adjacent to the commutator.

Fig. VI is a view similar to Fig. V, showing the contact member in the position it occupies when its final contact face engages the commutator.

I do not deem it necessary to show all of the elements of an electric motor, for these elements are old and well known in the art and they may be of any suitable design. To illustrate the invention, I have shown an armature 1 mounted on a shaft 2 provided with a commutator A, the armature and commutator being fixed to the shaft. The commutator comprises a circular row of contact members 3 insulated from each other as shown by Fig. II.

The short-circuiting device comprises a rotary holder B consisting of a pair of metal plates 4 and 5 surrounding the shaft 2, and secured together by means of nuts 6 and 7 on the threaded ends of rods 8. The nuts 6 and 7 are adjustably mounted on the rods, so the rotary holder can be adjusted toward and away from the commutator. The outer margins of plates 4 and 5 are separated from each other to form an annular recess in which short-circuiting contact members C are loosely mounted. A circular row of the contact members C is thus yieldingly supported at points adjacent to the circular row of commutator segments 3. Each contact member C is in the form of a segment having a notch 9 adapted to receive a flange extending from the periphery of the annular plate 5, and the plate 4 is provided with an annular flange at its periphery adapted to overlap the contact members C. The contact members are thus loosely confined between the plates 4 and 5, and they are free to move independently of each other. In response to centrifugal force, the loosely supported contact members C can be thrown away from the axis of shaft 2.

Each contact member C is preferably provided on one of its side edges with a flat final contact face 10 and on its peripheral edge with a beveled initial contact face 11, said faces being formed at an angle to each other. Each commutator segment 3 is provided with a final contact face 10' parallel with the face 10, and an initial contact face 11' parallel with the face 11.

Briefly stated, the operation of the elements so far described is as follows:

When the motor is at rest, the short-circuiting contact members C are widely separated from the commutator, as suggested by Figs. I and IV. It is to be understood that the rotary holder B turns with the commutator and at the same speed, so when the motor is started the loosely supported contact members C will be thrown outwardly by centrifugal force to the position suggested by Fig. V, wherein the initial contact face 11 is adjacent to the contact face 11'. As the speed increases, the rods 8 are pulled to the right from the positions shown by Figs. I and IV, this being accomplished through the medium of a speed-responsive device which will be hereafter described. The rotary holder B is shifted through the medium of the rods 8 so as to engage the initial contact faces 11 with the surrounding contact faces 11' on the commutator, and as the motion continues the faces 11 will slide along the faces 11' until the final contact faces 10 engage the final contact faces 10' on the commutator. Immediately before the initial contact faces 11 engage the faces 11', sparks will be produced between these faces, and thereafter the faces 11 will be rubbed on the faces 11' until the final contact faces 10 engage the faces 10'. While the faces 11 are sliding on the faces 11', the contact members C are forced toward the axis of the shaft 2, and at this time centrifugal force tends to throw said contact members C away from the shaft. As a consequence, the contact faces 11 are firmly engaged with the faces 11', while the contact members C are forced toward the final contact faces 10'. After the contact faces 10 engage the faces 10', the speed-responsive device to be hereafter described will firmly retain the contact members C in engagement with the final contact faces 10' on the commutator.

From the foregoing it will be understood that the individual contact members C are loosely supported in the rotary holder B so they will adjust themselves to irregularities on the commutator. Furthermore, the friction between the faces 11 and 11' tends to remove the irregularities resulting from sparks at these initial contact faces, and since the faces 10 do not engage the faces 10' until an electrical connection has been obtained at the faces 11 and 11', there will be no sparks produced between the final contact faces 10 and 10'.

Each of the short-circuiting contact members C shown in Fig. II contacts with two adjacent segments 3 on the commutator so as to form a short circuit, but it is not absolutely necessary for each contact member C to engage two of the segments 3. All of the contact members C are electrically connected to the metal plates 4 and 5, so the desired short circuit will be produced even though each contact member C engages only one of the segments 3.

As an illustration of a suitable speed-responsive operating means, I have shown a centrifugally actuated device whereby the rods 8 are moved in a direction parallel with the shaft 2. The speed-responsive device comprises a pair of rotary plates 12 and 13 mounted on the shaft 2, as shown by Figs. I and III. The rods 8 extend through the commutator and armature, as well as through the plates 12 and 13, and said rods are secured to the plate 13 and loosely mounted in the plate 12. If the plate 13 is moved to the right from the position shown by Fig. I, a corresponding movement will be imparted to the rotary holder B at the other ends of rods 8, so as to engage the contact members C with the commutator. A compression spring 14 (Fig. I), surrounding the shaft 2, engages a collar 15 on the shaft and presses against the plate 13, thereby tending to retain said plate 13 and rods 8 in the positions shown by Fig. I, wherein the plate 13 engages a stop pin 13' extending from the shaft 2. Weighted members 16 are mounted in notches in the peripheries of the plates 12 and 13, and each weighted member 16 is provided with an arm 17 located between the plates 12 and 13. A collar 18 (Figs. I and III) is provided with an annular flange 18' surrounding the weighted members 16 so as to confine them in the notches at the peripheries of plates 12 and 13.

In response to centrifugal force, the weighted ends of the members 16 are thrown away from the axis of shaft 2, and the operating arms 17 then cooperate with the plate 13 to place the rods 8 under tension, whereby the holder B and contact members C are moved toward the commutator.

It is not necessary to use pins or the like for the purpose of pivotally connecting the weighted members 16 to the plates 12, for these weighted members are confined in the notches at the peripheries of the plates 12 and 13 in such a manner that the desired pivotal movement can be obtained without the use of connecting pins or hinges.

I claim:

1. A motor having a commutator including contact members, and a short-circuiting device comprising a rotary holder movable with said commutator, short-circuiting contact members carried by said rotary holder, said holder being movable toward the first mentioned contact members so as to engage them with said short-circuiting contact members, and a speed-responsive device associated with said holder to force said short-circuiting contact members into engagement with the first mentioned contact members, said speed-responsive device including a pair of rotary plates surrounding the axis of said rotary holder, said plates having peripheral notches, weighted members mounted in said notches, each of said weighted members having an operating arm located between said rotary plates, and pull rods connecting one of said rotary plates to said rotary holder, the last mentioned plate being movable away from the other plate so as to provide for the transmission of motion from said operating arms to said rotary holder.

2. A motor having a commutator including contact members, and a short-circuiting device comprising a rotary holder movable with said commutator, short-circuiting contact members carried by said rotary holder, said short-circuiting contact members having on their peripheral edges initial contact faces slidable on the first mentioned contact members and final contact faces on their side edges adapted to be engaged subsequent to said initial contact faces, and speed-responsive means for shifting said rotary holder to successively engage said initial and final contact faces with the first mentioned contact members, said short-circuiting contact members being movable toward and away from the axis of said rotary holder so as to slide on the first mentioned contact members, and said holder being movable in a direction parallel with said axis to engage said final contact faces, said initial contact faces being at an angle to said final contact faces.

3. A motor having a commutator provided with a circular row of segmental contact members insulated from each other, said circular row of contact members being provided with final contact faces and inclined initial contact faces at an angle to and flaring outwardly from said final contact faces, and a short-circuiting device comprising a rotary holder movable with said commutator, a circular row of short-circuiting contact members loosely mounted in said rotary holder and movable away from the axis of said holder in response to centrifugal force, said short-circuiting contact members being surrounded by said inclined initial contact faces and provided on their peripheral edges with correspondingly inclined initial contact faces adapted to engage the surrounding inclined faces, said short-circuiting contact members having on their side edges final contact faces adapted to engage the final contact faces on the commutator, and a speed-responsive device whereby said rotary holder is shifted in a line parallel with its axis to slide the short-circuiting contact members inwardly on said surrounding inclined faces and into engagement with the final contact faces on the commutator.

4. A motor having a commutator provided with a circular row of segmental contact members insulated from each other, said circular row of contact members being provided with flat final contact faces and beveled initial contact faces at an angle to said final contact faces, and a short-circuiting device comprising a rotary holder movable with said commutator, said holder having a circular recess, a circular row of short-circuiting contact members loosely mounted in said circular recess and movable away from the axis of said holder in response to centrifugal force, said short-circuiting contact members being surrounded by said beveled initial contact faces and provided with correspondingly beveled initial contact faces adapted to engage the surrounding beveled faces, said short-circuiting contact members also having flat final contact faces adapted to engage the final contact faces on the commutator, and a speed-responsive device whereby said rotary holder is shifted in a line parallel with its axis to slide the short-circuiting contact members on said surrounding beveled faces and into engagement with the flat final contact faces on the commutator.

5. A motor having a commutator including contact members, and a short-circuiting device comprising a rotary holder movable with said commutator, short-circuiting contact members carried by said rotary holder, said holder being movable toward the first mentioned contact members so as to engage them with said short-circuiting contact members, and a speed-responsive device associated with said holder to force said short-circuiting contact members into engagement with the first mentioned contact members, said speed-responsive device including a pair of rotary thrust members surrounding the axis of said rotary holder, weighted members each having an operating arm interposed between said rotary thrust members, and means whereby motion is transmitted from one of said rotary thrust members to said rotary holder, the last mentioned rotary thrust member being movable away from the other rotary thrust member in response to movements of the interposed operating arms.

In testimony that I claim the foregoing I hereunto affix my signature.

JOSEPH C. STEINER.